United States Patent [19]

Jayawant

[11] 3,860,694

[45] Jan. 14, 1975

[54] PROCESS FOR THE PREPARATION OF PERHYDRATES

[75] Inventor: Madhusudan D. Jayawant, Hockessin, Del.

[73] Assignee: E. I. du Pont de Nemours and Company, Wilmington, Del.

[22] Filed: Aug. 31, 1972

[21] Appl. No.: 285,125

[52] U.S. Cl.................. 423/307, 423/186, 423/415
[51] Int. Cl... C01b 15/16, C01b 25/26, C01d 7/26, C01d 11/00, C22b 29/00, C01b 31/00
[58] Field of Search.................. 423/307, 415, 186

[56] References Cited
UNITED STATES PATENTS

| | | | |
|---|---|---|---|
| 1,225,722 | 5/1917 | Schaidhauf | 423/415 |
| 1,225,832 | 5/1917 | Liebknecht | 423/415 |
| 1,225,872 | 5/1917 | Liebknecht | 423/415 |
| 2,448,058 | 8/1948 | Slater et al | 423/415 |
| 2,541,733 | 2/1957 | Young | 423/315 |
| 3,140,149 | 7/1964 | Habernickel | 423/307 |

*Primary Examiner*—Oscar R. Vertiz
*Assistant Examiner*—Gregory A. Heller

[57] ABSTRACT

A process for producing stable, particular perhydrates of sodium carbonate and phosphates comprising contacting the precursor of the perhydrate with concentrated hydrogen peroxide solution in such quantity as to develop the desired active oxygen content in the particles. The perhydrate is recovered by drying. Stabilizers may be present in the precursor or may be added prior to, with, or after hydrogen peroxide addition. The perhydrate may be agglomerated to meet end-use particle size requirements by contacting the particles with water, optionally containing an agglomerating agent or stabilizer. Reaction and perhydrate uniformity are achieved by balancing water content, reaction conditions, residence time under reaction conditions, and stabilizer content.

36 Claims, No Drawings

3,860,694

PROCESS FOR THE PREPARATION OF PERHYDRATES

BACKGROUND OF THE INVENTION

This invention relates to a process for the preparation of perhydrate compounds, particularly sodium carbonate perhydrate (also commonly known as sodium percarbonate), and perphosphates from precursor compounds and hydrogen peroxide.

A great number of detergent, cleaning, rinsing, and scouring formulations contain solid peroxygen compounds, e.g., sodium percarbonate, sodium perborate, etc. The special action of these agents is based upon the fact that when placed in solution these compounds release hydrogen peroxide, which is a potent cleansing and bleaching agent. It is also thought that the oxygen gas which results from the decomposition of this peroxide in the cleansing medium promotes the removal and emulsification of soil particles from the substrate. Sodium percarbonate and perphosphate are used as additives in household detergent powders, in safety bleaches, as oxidants for leuco dyes, and as antichlor compounds. Sodium percarbonate has also been suggested as a preservative in milk, in the preparation of hair bleaching powders, and for other cosmetic purposes.

Numerous processes have been proposed for the manufacture of sodium percarbonate. In one basic process, which may be denominated the "wet" process, aqueous solutions of hydrogen peroxide and sodium carbonate are mixed in a reactor and the sodium percarbonate formed is filtered off. The product is sometimes salted out by the addition of sodium chloride or other suitable reagents. Such processes are disclosed in U.S. Pat. Nos. 2,380,620; 2,448,058; 2,541,733. While the wet process offers advantages such as good mixing and heat transfer, it has the disadvantage that there typically is a substantial loss of active oxygen in the mother liquor, so that low oxygen efficiencies are obtained. In another method, described in Austrian Pat. No. 140,553, sodium carbonate is reacted with hydrogen peroxide film on a moving support at such an angle that the wetted powder adheres to the support and is collected from this support as the product sodium percarbonate and the excess unreacted sodium carbonate is removed or dropped by gravity and recycled. This product sodium percarbonate is recycled repeatedly to increase its active oxygen content. In still another method, taught by U.S. Pat. No. 3,555,696, sodium percarbonate is made by a spray-drying process in which the spray charge of hydrogen peroxide solution is added immediately before the atomization of the spray charge of sodium carbonate in the spray tower and thereafter the product sodium percarbonate is dried. It is apparent from the prior art that a process which gives higher oxygen efficiencies (or hydrogen peroxide yields) in sodium percarbonate formation usually uses a sufficient amount of water as a reaction medium as well as a heat sink for the heat of reaction. When the reaction is carried out in the absence of a sufficient amount of water, the reaction is less sufficient and decomposition losses are quite high.

The desire to minimize the amount of water in the reaction system has led to exploration of the so-called "dry" method, which has been reported by Scholle and Duška in Chemický Prumysl, 8, 169–173 (Czechoslovakia, 1958). In this method, hydrogen peroxide is sprinkled directly onto sodium carbonate powder to form a moist mass which is then dried and the procedure is repeated to build up the oxygen content of the perhydrate. Attempts to operate such a process have produced only unsatisfactory perhydrate and thus it is not in commercial use, insofar as is known. Until the present invention, the parameters underlying the dry process have not been well understood and it has remained a mere novelty in the literature.

SUMMARY OF THE INVENTION

The present invention provides:

A process for the production of a stable perhydrate comprising:

a. Forming a wet reaction mass by contacting a particulate precursor selected from the group consisting of sodium carbonate, one or more sodium phosphates, and mixtures thereof, of particle size U.S. standard sieve number 14 to 325, under agitation and at a reaction temperature of about 20° to 60°C. with aqueous hydrogen peroxide of about 35 to 90 percent concentration by weight over a period of at least one-quarter hour, preferably one-half to 2 hours;

b. Maintaining the reaction mass under the above conditions for a residence period of at least 5 minutes, preferably between 10 minutes and 3 hours, after hydrogen peroxide addition is complete;

c. Optionally adding water during the residence period to make the water content of the reaction mass during reaction from about 0 to 50 percent, preferably about 4 to 35 percent, based on the dry weight of the reaction mass;

d. Stabilizing the final product against loss of active oxygen by incorporating a stabilizer in the precursor or in the hydrogen peroxide, the stabilizer being selected from the group consisting of magnesium sulfate, magnesium silicate, magnesium chloride, magnesium fluosilicate, magnesium oxide, and magnesium hydroxide, expressed as Mg; sodium silicate, expressed as Si; and ethylenediamine tetraacetic acid, diethylenetriamine pentaacetic acid and benzoic acid so as to introduce into the reaction mass, based on the weight of the dry perhydrate, about 150 to 10,000 parts per million by weight of stabilizer; or by post-adding about 500 to 10,000 parts per million by weight of a solid additive; and e. Drying the reaction mass, preferably at a temperature of about ambient to 90°C.

Optionally, about 0 to 2 moles, preferably about 0.1 to 1 mole, of water per mole of precursor may be added before the addition of hydrogen peroxide. If water is thus added to the precursor, the amount of water subsequently incorporated into the reaction mass may be proportionately reduced. After completion of the drying, agglomeration may be performed to make the particle size conform to end-use requirements.

DETAILED DESCRIPTION OF THE INVENTION

Sodium carbonate perhydrate conforms closely to the chemical formula $2Na_2CO_3 \cdot 3H_2O_2$ when in pure, crystalline and stable form. For the purposes of this invention, however, the term sodium percarbonate means a material having approximately 67.5 to 97 percent by weight of sodium carbonate and about 32.5 to 3 percent by weight of hydrogen peroxide. The percarbonate of this invention is thus an adduct of sodium carbonate and hydrogen peroxide in a wide range of proportions.

This material may also contain small amounts of contaminants such as water, sodium bicarbonate, and the impurities from sodium carbonate or hydrogen peroxide or the water used for the reaction. Furthermore, the percarbonate of this invention may also contain organic or inorganic stabilizing additives, added to the product either before, during or after the percarbonate reaction.

Any of the numerous phosphates of sodium would be operable in the process of the instant invention. Such phosphates would include the hypophosphates, the orthophosphates, the pyrophosphates, the metaphosphate, the tripolyphosphate and the hexametaphosphate (i.e., the polymeric phosphates). Preferred for this invention are materials containing approximately 79.6 to 95 percent by weight of sodium pyrophosphate ($Na_4P_2O_7$) or approximately 70.7 to 95 percent of trisodium phosphate ($Na_3PO_4$) or approximately 67.6 to 95 percent disodium hydrogen phosphate ($Na_2HPO_4$), in the final product, the remaining being $H_2O_2$, stabilizers, moisture and impurities.

The reaction between sodium carbonate and hydrogen peroxide forms a perhydrate, that is, a compound with hydrogen peroxide of crystallization. This sodium carbonate perhydrate theoretically contains 1.5 moles of hydrogen peroxide for every mole of sodium carbonate. $H_2O_2$ can be added to sodium carbonate in any proportion but the maximum amount of hydrogen peroxide in a stable solid product will not exceed the stoichiometric proportion. Although not commercially desirable, it is possible to make sodium carbonate perhydrates containing less $H_2O_2$. For example, if a reaction between less than 1.5 moles of hydrogen peroxide is carried out by the process of this invention, then solid adducts of hydrogen peroxide and sodium carbonate containing from about 1 percent to about 30 percent hydrogen peroxide can be formed. The theoretical amount of active oxygen present in a compound corresponding to the formula $Na_2CO_3.1.5H_2O_2$ is 15.28 percent, which corresponds to 32.47 percent $H_2O_2$ of crystallization. In the dry route of this invention, any desired amount up to the theoretical maximum of active oxygen can be incorporated in the final product. In addition, sodium bicarbonate, $NaHCO_3$, reacts with hydrogen peroxide to form sodium percarbonate. This means that any sodium bicarbonate present would be detrimental to the reaction efficiency.

This sodium percarbonate, that is, the perhydrate, is to be distinguished from a true peroxygen salt, which would correspond to the formula $Na_2CO_4$ or possibly $Na_2C_2O_6$. There has been no evidence of formation of such true stable percarbonic acid salts of sodium (although potassium ions form these salts which, however, are unstable and quite moisture sensitive).

According to the present invention, there is provided a dry process of preparing uniform and stable sodium percarbonate and sodium perphosphate which comprises sprinkling hydrogen peroxide solution on a particulate precursor, sodium carbonate or sodium phosphate, or mixtures thereof, so that the mixture is uniformly moistened and wetted but not soaked. The reaction may be carried out in a variety of different reactor types, e.g., a simple agitated vessel, a ribbon blender, a rotary dryer type reactor, etc., with or without forced air or external cooling. The mixing should be slow enough to minimize dusting but efficient enough to aerate, cool or heat, and mix the solid. Any given proportion of hydrogen peroxide can be chosen per given proportion of precursor, but a stoichiometric proportion is desired.

The prior art dry route for the formation of sodium percarbonate has a basic deficiency, namely, the difficulty of proper heat transfer of the exotherm that is generated as a result of the reaction. Reaction between aqueous hydrogen peroxide and solid soda ash generates an exotherm in two ways: the heat of hydration of sodium percarbonate with the water present in hydrogen peroxide, and the heat of perhydration, that is, the reaction of sodium percarbonate with hydrogen peroxide. Both these heats tend to increase the reaction temperature quite markedly, particularly in the absence of efficient mixing and/or cooling.

Dusting is another problem associated with the dry process. For example, when finely divided soda ash is sprinkled with hydrogen peroxide solution and mixed very efficiently to dissipate the heat, a large amount of dust is formed. This results in loss of active oxygen values from the process. On the other hand, if granular, large particle size, dense soda ash is used, the dusting effects are minimized but the reaction becomes relatively inefficient. This is mainly because of the lack of an adequate amount of the reaction medium, water. When a sufficient amount of water is not used, the hydrogen peroxide diffuses much more slowly into the crystal, with the result that only a partial reaction between hydrogen peroxide and large particle size $Na_2CO_3$ takes place. Such particles have unsatisfactory storage stability, showing a delayed but spontaneous decomposition in storage. This is because each insufficiently reacted particle of sodium percarbonate contains unreacted sodium carbonate in the core of the particle, and this carbonate continues to react with the excess $H_2O_2$ in the outer percarbonate layers of the particle. This slow but steady reaction in the dry product gives exothermic heat in storage and can result in accelerated and total decomposition of the product. Furthermore, such particles contain an active oxygen gradient and their $H_2O_2$-rich surface results in rapid decomposition under humid conditions. These problems were not heretofore recognized and have now been solved by the process of the instant invention.

While it would be desirable to have a finely divided soda ash or phosphate as a precursor in this process for a fast reaction with peroxide, the desired final particle is granular, indicating that preferably a granular precursor be used. This process is particularly suited for a granular precursor, although such is not required. Useful particle sizes are in the range 14 to 325 mesh, preferably 30 to 140 mesh (U.S. standard sieve sizes). The precursor is preferably quite dry, but may have a water content as high as about 30 percent. This would include water of crystallization. If the water content, including water of crystallization, is substantially in excess of 30 percent, the excess should be removed by evaporation to bring the water content down to about 30 percent or less. The precursor may also contain a stabilizer against active oxygen loss, e.g., magnesium sulfate, magnesium silicate, sodium silicate or mixtures of stabilizers. The precursor may also comprise a mixture, in any proportion, of sodium carbonate and phosphates.

The hydrogen peroxide solution to be used in the process of this invention can range in concentration from about 35 to 90 percent by weight. It has been found that hydrogen peroxide of strength 50 to 70 percent is preferable from the point of view of the efficiency of the reaction and agglomeration of the final product. It has also been found that the higher the strength of peroxide, the greater the potential active oxygen losses in the process. For example, the reaction between 70 percent peroxide and anhydrous sodium carbonate will develop higher temperatures of reaction because of the absence of an effective heat sink (free water), thereby encouraging decomposition. Also, the product is more dusty if 70 percent peroxide is used. As the strength of peroxide is decreased from about 70 percent to about 50 percent, the reaction tends to run cooler, there is less dusting and the hydrogen peroxide recoveries are higher. When the hydrogen peroxide concentration is below about 35 percent the amount of water present in hydrogen peroxide is too high for the reaction mixture to remain in the desired relatively moist but particulate form. Too much free water, i.e., water which evaporates under drying conditions, can cause caking of the reaction mass. According to the process of the instant invention, presence of the correct amount of water in hydrogen peroxide achieves two things. First, it acts as a heat sink for the reaction exotherm, which is substantial. Second, it acts as a solvent medium for peroxide to form perhydrate. With a sufficient amount of free water, the formation of the desired product proceeds smoothly. The free water content of the reaction mass during reaction should be maintained at about 0.5 to 50 percent, preferably 4 to 35 percent, based on the dry weight of the reaction mass.

Addition of water may be desirable after the addition of peroxide to cause efficient agglomeration, such agglomeration being desirable for certain end-use applications. It has been found that the addition of water before the addition of hydrogen peroxide to solid anhydrous sodium carbonate is detrimental to the general reaction efficiency and speed. This has been traced to the formation of sodium carbonate monohydrate, which prevents a speedy formation of sodium percarbonate. Any significant impurity of the monohydrate in the soda ash precursor would also tend to make the reaction less efficient and more difficult to control. (It is probably for this reason that the prior art mentions the use of calcined soda ash in the dry process).

Agglomeration is desirable as a means of enhancing the detergent stability of the perhydrate particles. Agglomeration can be accomplished quite simply, either batch-wise or continuously, by spraying or dripping water or hydrogen peroxide on the dry particles under agitation, followed by drying. The liquid may be added at temperatures from ambient to 60°C. or more, preferably about 20° to 50°C., and drying may be done at temperatures from ambient to about 90°C. If a hydrogen peroxide solution is used, its concentration may be within the range of about 35 to 70 percent by weight. It is preferable to incorporate an agglomerating aid, such as magnesium silicate, sodium silicate, polyvinyl alcohol and starches, which acts as a cementing agent. The agglomerating aid may be already present in the perhydrate particles from the reaction phase, or it may be added in the water or hydrogen peroxide. If the latter, in the case of magnesium silicate the peroxide may advantageously be formulated to contain about 3 to 50 gm/l peroxide of $MgSO_4 \cdot 7H_2O$, about 2 to 50 ml/l sodium silicate solution containing about 26 percent $SiO_2$, in the presence of about 4 to 20 ml/l of Dequest 2010 as a sequestering agent. It is preferable to carry out the agglomeration such that at least 90 percent of the product by weight has a particle size in the range −30 to +140 mesh.

The reaction may be conducted at temperatures between about 20° and 60°C. A temperature of above about 60°C. is quite undesirable for the efficient use of hydrogen peroxide. Preferably, the temperature should be kept at about 25° to 50°C. to promote relatively fast reaction with only minor losses in active oxygen values. Temperature of the reaction can be controlled by the speed of addition of hydrogen peroxide, the strength of hydrogen peroxide, and by efficient mixing of the reaction mixture, optionally coupled with cold or warm air flow over the reaction mixture to promote faster heat transfer and, optionally, partial evaporation of water. The temperature of the reaction, once controlled to the desired range, can be maintained by the hydrogen peroxide addition rate and by cold or hot air flows.

The addition of hydrogen peroxide may be made in at least about one-quarter of an hour to one hour; more time may be used, if desired. After the addition of hydrogen peroxide, there should be allowed before drying, a residence time during which the hydrogen peroxide which is still in liquid form and not totally reacted with the particulate precursor, is allowed to diffuse into the particles. A residence time of at least about five minutes, preferably about ten minutes to 3 hours, is necessary to form a product of uniform chemical composition. If the amount of water in the peroxide is insufficient during the peroxide addition, the reaction product will tend to be relatively dry. This would deprive peroxide of diffusion medium and would lower the speed of reaction. At this stage, that is, after the addition of peroxide and at the start of residence time, enough water may be added to the reaction mass to keep it uniformly moist (free water content about 4 to 35 percent) to promote an efficient reaction, but not soaked in such a way as to form a wet cake. In a rotary dryer-type reactor, this requirement is very important; when a wet cake is formed in the reactor it tends to coat the inside walls of the reactor and tumbling action is severely restricted. The rate of $H_2O_2$ addition and the length of the residence period are functions of particle size, the smaller the particles, the quicker the possible addition and the shorter the necessary residence period.

In a modification of the process, the total hydrogen peroxide requirement is added in two stages. In the first step only dilute hydrogen peroxide is added to the precursor, e.g., soda ash. For example, 5 to 20 percent peroxide solution can be added to the soda ash in the initial stage of the addition. In the second stage there is the addition of the balance of hydrogen peroxide requirement in a high strength form, i.e., 35 to 90 percent, preferably 35 to 70 percent. In this way one can minimize the losses of hydrogen peroxide that take place during the first 20 percent or less of the reaction, yet maintain the amount of water that is necessary for an efficient reaction to take place. In this modification, however, if too much water is used, sodium carbonate monohydrate formation predominates, thereby making the later sodium percarbonate formation a relatively slow step. To avoid this, the water content of the reaction mass may be kept below about 20 percent during the initial phase by restricting the amount of water added or by drying, for example, by forced hot air.

The amount of hydrogen peroxide used for any given amount of sodium carbonate will depend on the type of product desired as well as the active oxygen required in the final product. Normally, the maximum active oxygen, i.e., the stoichiometric ratio of 1.5 moles of hydrogen peroxide per mole of sodium carbonate, is sought after. However, any lower chemical proportion desired can be obtained in this process. Thus, for example, if a product containing only about 5 percent active oxygen is desired for some specialty purposes, one could add only about 33 percent of the stoichiometric quantity of hydrogen peroxide to soda ash. If a product of 15.2 percent active oxygen is desired, one could add about 110–115 percent of stoichiometry of hydrogen peroxide. The maximum amount of active oxygen that can be incorporated in soda ash would be 15.28 percent. However, under practical circumstances, because of the presence of various stabilizers, small amounts of water, and possibly sodium bicarbonate, the final active oxygen usually would not exceed about 15 percent. Under ideal conditions, the process of this invention gives up to about 97 percent of the theoretical hydrogen peroxide content.

Use of suitable stabilizers is essential to the conduct of an efficient process and to the formation of a stable product. Sodium percarbonate containing no stabilizer would decompose not only during the reaction but after its formation. Various stabilizers can be added to the reaction mass in one of several ways. Magnesium compounds such as the sulfate, silicate, fluosilicate, oxide and hydroxide, are efficient stabilizers for the perhydrates of this invention. Soluble magnesium salts can be added to hydrogen peroxide solution in any given amount before its addition to soda ash. Also, aqueous solutions of magnesium salts or sodium silicate (to form magnesium silicate in situ) can be sprinkled on the sodium carbonate either before or after the addition of hydrogen peroxide, either simultaneously or sequentially. Various combinations of procedures can be used in this process; for example, soluble magnesium salts can be added to the reaction via hydrogen peroxide to keep the decomposition of peroxide at a minimum, followed by an addition of more magnesium sulfate, or sodium silicate, etc., in water added to agglomerate the product.

In one variation, sodium silicate solution may be added to sodium carbonate solution and the mixture spray dried, thus incorporating sodium silicate in a very uniform manner in the solid sodium carbonate. On this solid sodium carbonate containing sodium silicate is sprinkled hydrogen peroxide containing soluble magnesium salts. In this way magnesium silicate is generated in situ in the final product.

There is yet another method that is suitable for the addition of both magnesium and silicate ions in hydrogen peroxide solution. Normally, the addition of magnesium sulfate and sodium silicate to hydrogen peroxide results in the precipitation of magnesium silicate, which tends to retard the absorption of hydrogen peroxide into the sodium carbonate. Addition of about 10 to 20 ml of a 5 percent polyvinyl alcohol solution to the hydrogen peroxide prevents the precipitation of about 0.5 to 1 gm of magnesium silicate gel. Thus, this protective colloid action of polyvinyl alcohol can be used advantageously to incorporate magnesium and silicate ions together in a clear homogeneous form in hydrogen peroxide. A hydroxyethyl diphosphonate complexing agent (such as Dequest 2010 from Monsanto Chemical Co.) may be substituted for the polyvinyl alcohol.

The amount of stabilizer used can vary according to the requirements of stability in the final product. Thus, for example, the presence of magnesium ions stabilizes sodium percarbonate in aqueous solutions, while the presence of silicate ions tends to stabilize percarbonate in the dry state against humid conditions. It has been found that an addition of at least about 150 ppm by weight or above, preferably 300 to 1,200 ppm, of magnesium, Mg, and about 200 to 10,000 ppm, preferably 500 to 5,000 ppm, of silicon, Si, gives a product of desired properties for use as detergent bleach additive.

In addition to the magnesium and silicon, various other stabilizers and sequestering agents can be added to the product, either in the hydrogen peroxide addition or in the agglomeration step. These stabilizers include ethylenediamine tetraacetic acid, diethylenetriamine pentaacetic acid, benzoic acid, or any other organic complexing agents which are known to sequester the heavy metal ions which cause decomposition of peroxygen compounds either in the dry state or in solution form.

Any other stabilizing, water-repelling or anti-caking additives, for example, silica, magnesium stearate, calcium silicate, clays, titanium dioxide, other stearic acid or long chain fatty acid amides or metal salts, ethanolamine derivatives of fatty acids, etc., can be added either to the solid sodium carbonate or can be blended in the final product, i.e., post-added. Useful concentrations of such solid additives range from about 500 to 10,000 ppm.

The moist product after reaction and agglomeration, if any, may be dried under normal atmospheric conditions at temperatures of about ambient to about 90°C., preferably 40° to 70°C. Forced air drying is very effective to give dry product in a short time without substantial decomposition of the hydrogen peroxide. When the efficiency of drying is poor, considerable hydrogen peroxide is decomposed. However, once the product is substantially dried, to a free moisture content of no more than about 2 percent, then the product tends to be quite stable, even on prolonged exposure to temperatures up to 100°C. The product also can be effectively dried in a fluid bed type of dryer where the air temperature is controlled to below about 90°C.

The process of the invention may be better understood by reference to the following Examples. Parts and percentages are by weight unless otherwise specified.

EXAMPLE 1

Onto 424 g. (4 moles) of soda ash (Stauffer "lite" granular soda ash of natural origin) was quickly sprayed 65 ml. distilled water and immediately the material was tumbled for 15 minutes in a Patterson-Kelly twin-shell V blender. This hydrated soda ash was placed in a Kitchenaid stainless steel mixer with wire whip stirrer attachment and mixed at a moderate speed. To this was added dropwise 228 ml. of Du Pont's Albone 70% $H_2O_2$ (291.2 g., 6 moles) containing 3 g. of $MgSO_4 \cdot 7H_2O$, 1.2 ml. Dequest 2010 in 50 percent solution (a 50 percent aqueous solution of hydroxyethyl diphosphonate from Monsanto) and 3 g. silicate solution (a 37 percent solution of silicate with $Na_2O$:$SiO_2$ ratio of 1:2.55), previously added in that order. The $H_2O_2$ solution was water clear. Addition of $H_2O_2$ was made in 27 minutes. The product warmed up initially to about 40°C., but cooled rapidly of its own accord as the addition of $H_2O_2$ progressed. At the end of the reaction, the product was slightly dusty. After further mixing of 30 minutes (residence time), the product was dried for two hours at 70°C. in a forced air recirculating oven. Total wet product was 719 g. of 13.5 percent active oxygen (AO). Three hundred and eight grams of the wet product on drying in a thin layer gave 279.6 g. of dry product of AO 14.53 percent. The dry product did not decompose under adiabatic conditions at about 60°C.

Overall $H_2O_2$ recovery was 97.6 percent. The product was quite stable; after eight months of storage in a polyethylene jar, the product showed an AO of 13.87 percent, averaging a loss of only 0.0825 AO units per month.

EXAMPLE 2

This was a repeat of the procedure of Example 1 except that after the $H_2O_2$ addition, 50 ml. distilled water was added dropwise to the damp product to allow further agglomeration. The addition was made in five minutes with brisk mixing of the reaction mixture. After the 30-minute residence time (with stirring), the moist batch weighed 733 g. and gave an AO of 12.52 percent. On drying 315 g. of the above material in thin layer in a forced air recirculating oven at 70°C. for 2 hr., 263.3 g. of granular dry product was obtained. The AO was 14.3 percent, thus giving a final overall $H_2O_2$ recovery of 91.2 percent.

The product was well agglomerated, 95 percent of it being between U.S. standard sieve sizes 14 and 80. The active oxygen loss in eight months averaged 0.15 percent AO units per month from the original value.

EXAMPLE 3 a. Preparation of magnesium silicate slurry. 2.46 g. of $MgSO_4.7H_2O$ was dissolved in 20 ml. water and to it was added while stirring 57.6 ml. of 2.69 percent silicate solution (of Example 1). The magnesium silicate precipitate was centrifuged, the aqueous layer decanted off, and the solid further triturated with water then centrifuged and the water layer decanted off. 78 ml. of fresh water was then added and this slurry used in the following.

b. Preparation of sodium percarbonate. To 212 g. (2 moles) of Stauffer "lite" soda ash was quickly added through an atomizer 10 ml. of water and then the hydrated soda ash tumbled in a Patterson-Kelly twin-shell blender for 15 minutes. After blending, the soda ash was transferred to a Kitchenaid mixer, mixed briskly and 145.8 g. (3 moles) of Du Pont's 70 percent Albone $H_2O_2$ containing 0.5 g. $MgCl_2.6H_2O$ was dripped in slowly. The addition took 33 minutes. After $H_2O_2$ addition, 48 ml. of the well-mixed magnesium silicate slurry of (a), above, was added in 8 minutes. The batch was then allowed a residence time of 30 minutes.

The reaction mixture at this point weighed 344 g. and had an AO of 12.83 percent. 300 g. of the well agglomerated reaction mixture on drying gave 262 g. of dry product of 14.36 percent active oxygen. The overall $H_2O_2$ recovery was 90.0 percent of theoretical.

EXAMPLE 4 a. Preparation of $H_2O_2$ reactant. 1 g. of $MgSO_4.7H_2O$ was dissolved in 80 g. of Du Pont's Albone 70 percent $H_2O_2$ (1.65 moles) and to the solution was added 15.5 ml. of 5 percent solution of Du Pont's 17 centipoise viscosity Elvanol EP 9050 polyvinyl alcohol. Following this a solution of 0.545 g. of sodium metasilicate in about 5 ml. of water was added, with stirring, to the $H_2O_2$ solution. The solution was stirred very slowly and remained clear.

b. Percarbonate formation. The above $H_2O_2$ solution was dripped slowly on 106 g. (1 mole) of anhydrous fine sodium carbonate (from Baker and Adamson, ACS reagent grade) kept in a one liter polyethylene beaker. The soda ash was manually mixed with a wide blade stainless steel spatula. The addition time was about 30 minutes. The temperature of the reaction remained at the normal 30°-40°C. The material was dried at 40°-45°C. overnight. The final product weighted 167 g. and gave an AO of 13.8 percent. The $H_2O_2$ recovery was 87.3 percent.

Calculated on the basis of the amounts of stabilizers added, the product contained:
591 ppm Mg
750 ppm Si
4640 ppm polyvinyl alcohol

EXAMPLE 5 a. $H_2O_2$ solutions.
1. To 50.5 g. (0.75 mole) Du Pont's 50% Albone $H_2O_2$ was added a solution of $MgSO_4.7H_2O$ (1.2 g.) in water (5 ml.).
2. To 50.5 g. (0.75 mole) Du Pont's 50% Albone $H_2O_2$ was added a solution of 0.4 ml. of Star silicate (Example 1) in 5 ml. of water.

b. Preparation of percarbonate. Solutions a(1) and a(2) were dripped simultaneously and at equal rates from two 50 ml. burettes onto 106 g. (1 mole) anhydrous, fine sodium carbonate (mentioned in Example 4). The burettes were placed at an angle so that the droplets from each of the dripping solutions merged before dropping on the $Na_2CO_3$. The addition took about 30 minutes, after which the product was dried at 50°C. until there was no loss of weight.

The dry product weighed 152 g. and showed an AO of 14.26%. $H_2O_2$ recovery amounted to 90.3 percent. After 20 months of storage at ambient temperatures, the product gave an AO of 11.59 percent, averaging a loss of 0.133 active oxygen unit per month.

EXAMPLE 6

To 112 g. (1.65 mole) of 50% $H_2O_2$ (Du Pont's Albone) was added 3 g. $MgSO_4.7H_2O$, 0.3 g. diethylenetriamine pentaacetic acid (DTPA), and 2.0 g. anhydrous $Na_2CO_3$. This solution was adjusted to pH 7 by the addition of about 20 ml. of 1 N NaOH solution.

The above clear $H_2O_2$ solution was added dropwise to 106 g. (1 mole) anhydrous $Na_2CO_3$ (fine, ACS reagent grade) in a one liter polyethylene beaker. Mixing was done manually, with a wide blade stainless steel spatula. The reaction mixture tended to be warmer than usual (to about 45°C.-50°C.). The addition took 45 minutes. The product was wet at the end of the addition. It was dried overnight in a forced air over at about 35°C. Yield was 161 g. of material with 14.5 percent AO. The $H_2O_2$ recovery was 88.5 percent.

After 130 days in a closed plastic jar at ambient conditions, the AO was 14.36 percent, giving an average loss of 0.033 AO unit per month.

EXAMPLE 7

To 14.2 gm. (0.1 mole) of anhydrous disodium hydrogen phosphate ($Na_2HPO_4$) in a 100 ml. beaker was added dropwise 5 gm. (0.103 mole) of 70 percent hydrogen peroxide containing 0.1 gm. $MgSO_4.7H_2O$. The reaction mixture was mixed vigorously with a spatula. The reaction was exothermic and the reaction temperature was about 45°C. The product was dried at 50°C. for 3 hours. The yield of the dry product, disodium hydrogen phosphate hydroperoxidate (perhydrate), was 17 gms. The active oxygen content was 13%. Based on this, there was 94 percent recovery of $H_2O_2$ in the reaction.

EXAMPLE 8

To 83.5 gm. (0.314 mole) of anhydrous tetrasodium pyrophosphate ($Na_4P_2O_7$) was added dropwise and with vigorous mixing 30.5 gm. (0.628 mole) of 70% hydrogen peroxide containing 0.2 gm. of $MgSO_4.7H_2O$. The temperature of the reaction was 45°C. The reaction mass was relatively particulate and free-flowing throughout the addition of $H_2O_2$. The reaction was exothermic.

The product was dried overnight at 40°C., yielding 104.4 gm. of tetrasodium pyrophosphate hydroperoxidate (perhydrate) of active oxygen content of 9.1 percent. Based on this, a hydrogen peroxide recovery of 95.8 percent was obtained.

I claim:

1. A dry process for the production of a stable perhydrate comprising:
    a. Forming a moist particulate reaction mass by contacting a particulate precursor selected from the group consisting of sodium carbonate, sodium phosphates, and mixtures thereof, of particle size U.S. standard sieve number 14 to 325, under agitation and at a reaction temperature of about 20° to 60°C. with aqueous hydrogen peroxide of about 35 to 90 percent concentration by weight over a period of at least one-quarter hour;
    b. Maintaining the reaction mass under the above conditions for a residence period of at least about five minutes after hydrogen peroxide addition is complete;
    c. Adding water during the residence period to make the water content of the reaction mass during reaction from about 4 to 35 percent based on the dry weight of the reaction mass;
    d. Stabilizing the final product against loss of active oxygen by incorporating therein a stabilizer selected from the group consisting of magnesium sulfate, magnesium silicate, magnesium chloride, magnesium fluosilicate, magnesium oxide, and magnesium hydroxide, expressed as Mg; sodium silicate, expressed as Si and mixtures thereof so as to introduce into the reaction mass, based on the weight of the dry perhydrate, about 300 to 1200 parts per million by weight of Mg and 200 to 10,000 parts per million by weight of Si and
    e. Drying the reaction mass.

2. A process of claim 1 wherein the reaction temperature is about 25° to 50°C.

3. A process of claim 1 wherein the particle size is about 30 to 140 U.S. standard sieve number.

4. A process of claim 1 wherein the drying temperature is about ambient to 90°C.

5. A process of claim 1 wherein the stabilizer is magnesium silicate.

6. A process of claim 5 wherein the magnesium silicate is formed in situ.

7. A process of claim 1 wherein the hydrogen peroxide concentration is about 50 to 70 percent by weight.

8. A process of claim 1 wherein the residence period is about 10 minutes to 3 hours.

9. A process of claim 1 comprising the additional step of agglomerating the perhydrate after drying.

10. A process of claim 1 comprising the additional step of adding about 0 to 2 moles of water per mole of precursor prior to the addition of hydrogen peroxide.

11. A process of claim 1 wherein the precursor is sodium carbonate.

12. A process of claim 1 wherein the precursor is selected from the group consisting of the pyrophosphates of sodium, disodium hydrogen phosphate and trisodium phosphate.

13. A process of claim 1 wherein the precursor is a mixture of sodium carbonate and sodium phosphate.

14. The process of claim 1 wherein the stabilizer is incorporated into the hydrogen peroxide with which the particulate precursor is contacted.

15. The process of claim 1 wherein the stabilizer is incorporated into the particulate precursor.

16. The process of claim 1 wherein the final product is stabilized with 500 to 5,000 parts per million by weight of Si.

17. The process of claim 1 wherein ethylenediamine tetraacetic acid, diethylenetriamine pentaacetic acid, benzoic acid, silica, magnesium stearate, calcium silicate, clays, titanium dioxide, stearic acid amides and stearic acid metal salts are incorporated as additives into the final product at concentrations of from 500 to 10,000 parts per million.

18. The process of claim 17 wherein the additive is added to the particulate precursor.

19. A dry process for the production of a stable perhydrate comprising:
    a. Forming a moist particulate reaction mass by contacting a particulate precursor selected from the group consisting of sodium carbonate, sodium phosphates, and mixtures thereof, of particle size U.S. standard sieve number 14 to 325 mesh, under agitation and at a reaction temperature of about 20° to 60°C. with aqueous hydrogen peroxide in two stages: in the first stage adding about 5 to 20 percent hydrogen peroxide by weight until up to about 20 percent of the total peroxide requirement has been added while maintaining the water content of the reaction mass below about 20 percent, then in the second stage adding the remaining peroxide requirement as a peroxide solution of about 35 to 90 percent concentration, the total peroxide requirement being added over a period of at least one-quarter hour;
    b. Maintaining the reaction mass under the above conditions for a residence period of at least about five minutes after hydrogen peroxide addition is complete;
    c. Adding water during the residence period to make the water content of the reaction mass during reaction from about 4 to 35 percent based on the dry weight of the reaction mass;

d. Stabilizing the final product against loss of active oxygen by incorporating therein a stabilizer selected from the group consisting of magnesium sulfate, magnesium silicate, magnesium chloride, magnesium fluosilicate, magnesium oxide, and magnesium hydroxide, expressed as Mg; sodium silicate, expressed as Si and mixtures thereof so as to introduce into the reaction mass, based on the weight of the dry perhydrate, about 300 to 1200 parts per million by weight of Mg and 200 to 10,000 parts per million by weight of Si and e. Drying the reaction mass.

20. A process of claim 19 wherein the reaction temperature is about 25° to 50°C.

21. A process of claim 19 wherein the drying temperature is about ambient to 90°C.

22. A process of claim 19 wherein the hydrogen peroxide concentration during the second stage is about 50 to 70 percent by weight.

23. A process of claim 19 wherein the particle size is about 30 to 140 U.S. standard sieve number.

24. A process of claim 19 wherein the stabilizer is magnesium silicate.

25. A process of claim 24 wherein the magnesium silicate is formed in situ.

26. A process of claim 19 wherein the residence period is about 10 minutes to 3 hours.

27. A process of claim 19 comprising the additional step of agglomerating the perhydrate after drying.

28. A process of claim 19 comprising the additional step of adding up to 2 moles of water per mole of precursor immediately prior to the addition of hydrogen peroxide.

29. A process of claim 19 wherein the precursor is sodium carbonate.

30. A process of claim 19 wherein the precursor is selected from the group consisting of the pyrophosphates of sodium, disodium hydrogen phosphate and trisodium phosphate.

31. A process of claim 19 wherein the precursor is a mixture of soidum carbonate and sodium phosphate.

32. The process of claim 19 wherein the stabilizer is incorporated into the hydrogen peroxide with which the particulate precursor is contacted.

33. The process of claim 19 wherein the stabilizer is incorporated into the particulate precursor.

34. The process of claim 19 wherein the final product is stabilized with 500 to 5,000 parts per million by weight of Si.

35. The process of claim 19 wherein ethylenediamine tetraacetic acid, diethylenetriamine pentaacetic acid, benzoic acid, silica, magnesium stearate, calcium silicate, clays, titanium dioxide, stearic acid amides and stearic acid metal salts are incorporated as additives into the final product at concentrations of from 500 to 10,000 parts per million.

36. The process of claim 35 wherein the additive is added to the particulate precursor.

* * * * *